D. C. GILLEN.
AUTOMOBILE TRAFFIC SIGNAL.
APPLICATION FILED APR. 30, 1918.
1,319,276.
Patented Oct. 21, 1919.
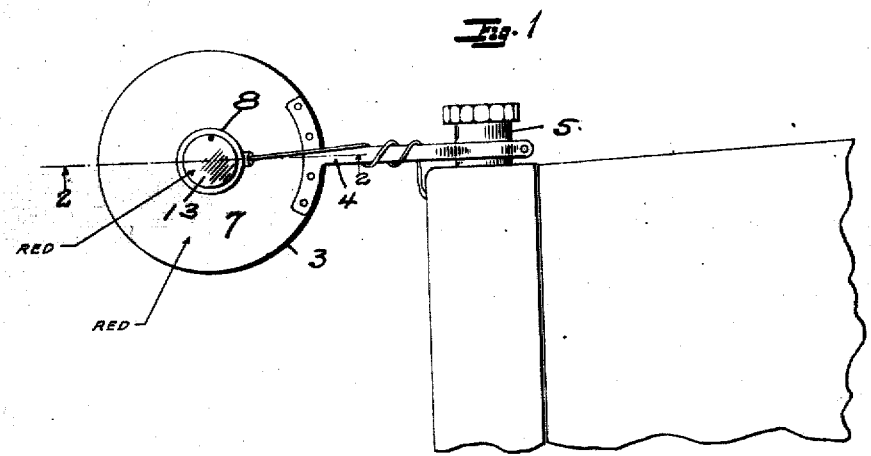
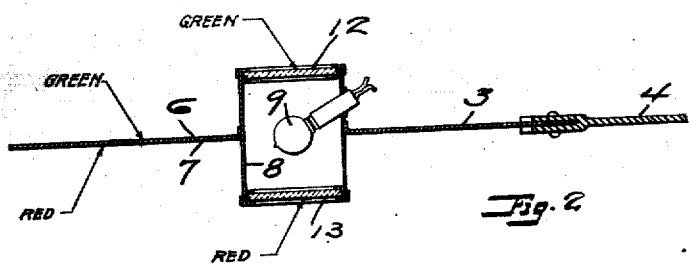
WITNESS
J. B. Gardner
INVENTOR.
D. C. GILLEN
BY White Prost
ATTORNEYS

UNITED STATES PATENT OFFICE.

DANIEL C. GILLEN, OF SAN FRANCISCO, CALIFORNIA.

AUTOMOBILE TRAFFIC-SIGNAL.

1,319,276.  Specification of Letters Patent.  Patented Oct. 21, 1919.

Application filed April 30, 1918. Serial No. 231,703.

*To all whom it may concern:*

Be it known that I, DANIEL C. GILLEN, a citizen of the United States, and a resident of the city and county of San Francisco and State of California, have invented a certain new and useful Automobile Traffic-Signal, of which the following is a specification.

The invention relates to a traffic signal adapted to be carried by an automobile.

An object of the invention is to provide a signal on an automobile which indicates to the driver of another vehicle, meeting the automobile at a street intersection, which vehicle has the right of way. Many accidents are caused at street intersections due to the lack of familiarity of drivers with the rules of the road, and an object of this invention is to provide a signal on an automobile which will cause drivers to obey the rules of the road without being familiar with them.

The rules provide that at street intersections, the vehicle approaching the crossing from the right has the right of way, that is, if the driver of an automobile in approaching a street intersection observes another automobile approaching the intersection from the left on the cross street, the driver of the first automobile has the right of way, whereas if the vehicle on the cross street was approaching from the right of the driver of the first automobile, the driver of the second automobile has the right of way.

The device of my invention is disclosed in the accompanying drawings in which

Figure 1 is a side elevation of the device secured to the filling neck of the radiator of an automobile.

Fig. 2 is a cross section taken on the line 2—2 Fig. 1.

The device of my invention consists of a disk 3 or other suitably shaped object, which is provided with means for supporting it upon the automobile, preferably in a conspicuous position in front of the automobile. In the present instance the supporting means consists of a bracket 4 provided with a clamp adapted to engage the radiator neck 5. The disk is supported on the automobile, so that it lies in a vertical plane extending in the direction of the longitudinal axis of the automobile, so that when the automobile is observed from the right, the face 6 of the disk is seen and when observed from the left, the face 7 of the disk is seen. The face 6 of the disk is painted a color such as green, which is universally recognized as indicating a clear track and "go ahead", and the face 7 of the disk is painted red, a color which is universally recognized as indicating danger and "stop".

Arranged in the disk, preferably at the center, is a cylindrical housing 8, disposed perpendicularly to the disk, and within the housing is an electric lamp 9 which is preferably connected in circuit with the head lights of the automobile. The end of the housing which projects from the disk on the right side is closed with a green lens 12 to correspond to the color of the face 6 of the disk and the other end of the housing is closed with a red lens 13 to correspond to the color of the face 7 of the disk.

The device serves therefore, either by day or by night, to signal the approaching car at an intersection either to proceed or to stop, depending upon the direction of approach of the car and by providing all automobiles with such devices, the danger of accidents at street intersections would be vastly minimized.

I claim:

A traffic signal comprising a flat plate, the opposite faces of the plate being of different colors, a housing arranged within the periphery of the plate, a lamp in said housing, lenses in the ends of said housing corresponding in color to the adjacent faces of the plate, and a bracket secured to said plate and adapted to be secured to the neck of the automobile radiator to fixedly hold the plate in front of the radiator in a vertical plane passing longitudinally through the automobile.

In testimony whereof, I have hereunto set my hand at San Francisco, California, this 23rd day of April, 1918.

DANIEL C. GILLEN.

In presence of—
H. G. PROST.